(12) United States Patent
Boglio et al.

(10) Patent No.: US 11,022,222 B2
(45) Date of Patent: Jun. 1, 2021

(54) CONTROL VALVE FOR FLUID TREATMENT APPARATUS

(71) Applicant: CULLIGAN INTERNATIONAL COMPANY, Rosemont, IL (US)

(72) Inventors: Eugene Boglio, Glendale Heights, IL (US); Doug Anderson, St. Charles, IL (US); Adam Sloma, Arlington Heights, IL (US); Lonnie Webb, Waterford, WI (US); Harkirat Sahni, Tampa, FL (US); Bill Lathouris, Arlington Heights, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 0 days.

(21) Appl. No.: 16/560,807

(22) Filed: Sep. 4, 2019

(65) Prior Publication Data

US 2019/0390777 A1    Dec. 26, 2019

Related U.S. Application Data

(62) Division of application No. 15/282,452, filed on Sep. 30, 2016, now Pat. No. 10,612,670.

(Continued)

(51) Int. Cl.
*F16K 1/46*    (2006.01)
*C02F 5/00*    (2006.01)
(Continued)

(52) U.S. Cl.
CPC .................. *F16K 1/36* (2013.01); *C02F 1/42* (2013.01); *C02F 5/00* (2013.01); *F16K 1/46* (2013.01);
(Continued)

(58) Field of Classification Search
CPC ...... C02F 1/42; C02F 5/00; F16K 1/36; F16K 1/46; F16K 3/246; F16K 11/10;
(Continued)

(56) References Cited

U.S. PATENT DOCUMENTS 2,011,547 A ‡ 8/1935 Campbell ............... E21B 34/06
                                                   137/1
3,593,959 A ‡ 7/1971 Greene ............... F16K 31/1221
                                                   251/63.6

(Continued)

FOREIGN PATENT DOCUMENTS

CN      101531407 A  ‡  9/2009
CN      101531407 A      9/2009
(Continued)

OTHER PUBLICATIONS

Hydrus Owner's Manual, Kinetico Incorporated 2011, Product No. 12223E.‡

(Continued)

*Primary Examiner* — Kevin R Barss
(74) *Attorney, Agent, or Firm* — Greer, Burns & Crain, Ltd.

(57) ABSTRACT

A control valve is provided for a fluid treatment apparatus, including a housing with at least one cylinder defining a fluid flow path in the apparatus, each cylinder having an associated reciprocating piston valve. The valve includes a first piston valve half; a second piston valve half complementary to the first piston valve half; and a resilient seal constructed and arranged for being sandwiched between the first and second piston valve halves. The first piston valve half is constructed and arranged for engaging the cylinder before the second piston valve half, and having an exterior peripheral edge defined by a plurality of peripherally spaced teeth creating flow spaces between the teeth.

13 Claims, 18 Drawing Sheets

Related U.S. Application Data

(60) Provisional application No. 62/245,751, filed on Oct. 23, 2015.

(51) Int. Cl.
  *F16K 1/36* (2006.01)
  *F16K 11/10* (2006.01)
  *F16K 27/04* (2006.01)
  *F16K 27/02* (2006.01)
  *C02F 1/42* (2006.01)
  *F16K 47/04* (2006.01)
  *F16K 31/122* (2006.01)
  *F16K 31/124* (2006.01)
  *F16K 3/24* (2006.01)

(52) U.S. Cl.
  CPC .............. *F16K 3/246* (2013.01); *F16K 11/10* (2013.01); *F16K 27/0263* (2013.01); *F16K 27/04* (2013.01); *F16K 31/122* (2013.01); *F16K 31/1245* (2013.01); *F16K 47/04* (2013.01); *C02F 2201/005* (2013.01)

(58) Field of Classification Search
  CPC .... F16K 27/0263; F16K 27/04; F16K 31/122; F16K 31/1245; F16K 47/04
  See application file for complete search history.

(56) References Cited

U.S. PATENT DOCUMENTS

| | | | | |
|---|---|---|---|---|
| 3,616,920 A ‡ | 11/1971 | Cambot | ................ | C02F 1/42 210/19 |
| 3,701,360 A ‡ | 10/1972 | Morrison | ................ | C02F 1/42 137/45 |
| 3,779,281 A ‡ | 12/1973 | Brane | ................ | C02F 1/42 137/62 |
| 3,797,523 A ‡ | 3/1974 | Brane | ................ | C02F 1/42 137/59 |
| 3,951,802 A ‡ | 4/1976 | Derouineau | ................ | B01J 49/75 210/13 |
| 4,210,532 A ‡ | 7/1980 | Loke | ................ | C02F 1/42 137/62 |
| 4,275,448 A ‡ | 6/1981 | Le Dall | ................ | C02F 1/42 210/14 |
| 4,290,451 A ‡ | 9/1981 | Fleckenstein | ................ | C02F 1/42 137/59 |
| 4,379,057 A ‡ | 4/1983 | Meiser | ................ | C02F 1/42 210/66 |
| 4,427,549 A ‡ | 1/1984 | Brown | ................ | B01J 39/04 210/26 |
| 4,539,106 A ‡ | 9/1985 | Schwartz | ................ | C02F 1/42 210/14 |
| 4,795,131 A ‡ | 1/1989 | Scarano | ................ | F16K 31/1223 137/625.3 |
| 4,919,314 A ‡ | 4/1990 | Nishiyama | ................ | C02F 1/42 137/62 |
| 4,971,287 A ‡ | 11/1990 | Shaw | ................ | E03D 5/10 251/129.04 |
| 5,042,775 A ‡ | 8/1991 | Willemsen | ................ | F16K 31/402 222/14 |
| 5,116,491 A ‡ | 5/1992 | Brane | ................ | C02F 1/42 210/14 |
| 5,234,601 A ‡ | 8/1993 | Janke | ................ | B01J 49/85 210/13 |
| 5,244,013 A ‡ | 9/1993 | Gagas | ................ | C02F 1/42 137/62 |
| 5,406,973 A ‡ | 4/1995 | Lange | ................ | F16K 1/02 137/454.5 |
| 5,490,932 A ‡ | 2/1996 | Hansen | ................ | C02F 1/42 137/62 |
| 5,817,231 A ‡ | 10/1998 | Souza | ................ | B01D 61/08 210/96 |
| 5,908,549 A ‡ | 6/1999 | Wigen | ................ | B01D 33/073 210/12 |
| 6,051,144 A ‡ | 4/2000 | Clack | ................ | B01D 35/143 210/10 |
| 6,176,258 B1 ‡ | 1/2001 | Bernardi | ........... | F16K 31/52483 137/55 |
| 6,206,042 B1 ‡ | 3/2001 | Channell | ................ | C02F 1/00 137/27 |
| 6,214,214 B1 ‡ | 4/2001 | Hansen | ................ | C02F 1/42 137/62 |
| 6,293,298 B1 ‡ | 9/2001 | Brane | ................ | F16K 11/065 137/24 |
| 6,347,644 B1 ‡ | 2/2002 | Channell | ................ | F16K 11/20 137/59 |
| 6,402,944 B1 ‡ | 6/2002 | Vaughan | ................ | C02F 1/42 137/59 |
| 6,428,708 B1 ‡ | 8/2002 | Halemba | ................ | B01D 29/603 210/73 |
| 6,444,127 B1 ‡ | 9/2002 | Vaughan | ................ | F16K 31/046 137/55 |
| 6,596,159 B1 ‡ | 7/2003 | Maruyama | ................ | B01J 49/85 137/62 |
| 6,622,933 B1 ‡ | 9/2003 | Young | ................ | A01G 25/02 137/624.14 |
| 6,644,349 B2 ‡ | 11/2003 | Scanlan et al. | ........ | F16K 11/07 137/62 |
| 6,863,808 B2 ‡ | 3/2005 | Fullmer | ................ | B01J 47/022 210/19 |
| 6,962,657 B2 ‡ | 11/2005 | Jordan | ................ | C02F 1/008 210/19 |
| 7,004,200 B1 ‡ | 2/2006 | Wittig | ................ | F16K 15/04 137/84 |
| 7,243,669 B2 ‡ | 7/2007 | Vaughan | ................ | F16K 15/18 137/1 |
| 7,261,819 B2 ‡ | 8/2007 | Jordan | ................ | C02F 1/008 210/67 |
| 7,364,651 B2 ‡ | 4/2008 | Baarman | ................ | C02F 1/008 210/14 |
| 7,373,949 B2 ‡ | 5/2008 | Park | ................ | C02F 1/42 137/62 |
| 7,608,183 B2 ‡ | 10/2009 | Lillback | ................ | B01D 24/4642 210/10 |
| 7,610,933 B2 ‡ | 11/2009 | Honzelka | ................ | C02F 1/42 137/31 |
| 7,670,485 B2 ‡ | 3/2010 | Duplessis | ................ | C02F 1/008 210/19 |
| 7,735,805 B2 ‡ | 6/2010 | Cornell | ................ | C02F 1/42 137/24 |
| 7,784,999 B1 * | 8/2010 | Lott | ................ | B01F 5/0413 366/163.2 |
| 7,988,852 B2 ‡ | 8/2011 | Duplessis | ................ | C02F 1/008 210/19 |
| 8,141,848 B2 ‡ | 3/2012 | Elston | ................ | F16K 11/0712 137/62 |
| 8,180,489 B2 ‡ | 5/2012 | Quinn | ................ | C02F 1/008 340/50 |
| 8,221,616 B2 ‡ | 7/2012 | Lillback | ................ | B01D 24/4642 210/14 |
| 8,302,631 B2 ‡ | 11/2012 | Quinn | ................ | F16K 11/22 137/59 |
| 8,328,162 B2 ‡ | 12/2012 | Prescott | ................ | C02F 1/42 137/27 |
| 8,414,433 B2 ‡ | 4/2013 | Kadokawa | ................ | F16H 9/18 474/18 |
| 8,529,768 B2 ‡ | 9/2013 | Chandler, Jr. | ............ | C02F 1/42 210/14 |
| 8,535,539 B2 ‡ | 9/2013 | Chandler, Jr. | ............ | C02F 1/42 210/19 |
| 8,535,540 B2 ‡ | 9/2013 | Chandler, Jr. | ............ | C02F 1/42 210/41 |
| 8,741,148 B2 ‡ | 6/2014 | Park | ................ | B01D 61/025 210/65 |
| 8,865,001 B2 ‡ | 10/2014 | Gruett | ................ | B01D 29/66 210/66 |
| 9,151,277 B2 | 10/2015 | Yang et al. | | |
| 9,195,240 B2 | 11/2015 | Bishoff et al. | | |

(56) References Cited

U.S. PATENT DOCUMENTS

| | | | |
|---|---|---|---|
| 2002/0121481 A1 ‡ | 9/2002 | Peterson | B01J 20/20 210/67 |
| 2003/0019802 A1 ‡ | 1/2003 | Roff | C02F 1/008 210/13 |
| 2009/0314701 A1 ‡ | 12/2009 | Jeong | C02F 1/42 210/19 |
| 2010/0222928 A1 ‡ | 9/2010 | Jeong | C02F 1/42 700/27 |
| 2012/0312750 A1 ‡ | 12/2012 | Chandler, Jr. | C02F 1/42 210/68 |
| 2012/0312756 A1 ‡ | 12/2012 | Chandler, Jr. | C02F 1/42 210/75 |
| 2013/0105322 A1 ‡ | 5/2013 | Averbeck | C02F 1/008 204/55 |
| 2013/0105326 A1 ‡ | 5/2013 | Averbeck | C02F 1/008 204/66 |
| 2013/0202465 A1 ‡ | 8/2013 | Jahn | B60T 8/4031 417/437 |
| 2013/0248457 A1 ‡ | 9/2013 | Park | C02F 1/42 210/73 |
| 2014/0013839 A1 ‡ | 1/2014 | Chandler, Jr. | C02F 1/42 73/290 |
| 2014/0298986 A1 ‡ | 10/2014 | Blaszczykiewicz | F16J 1/01 92/172 |
| 2014/0299550 A1 ‡ | 10/2014 | Kovach | B01J 49/75 210/67 |
| 2014/0352812 A1 ‡ | 12/2014 | Dulin | F16K 31/002 137/46 |
| 2015/0192210 A1 ‡ | 7/2015 | Averbeck | C02F 1/008 137/62 |
| 2015/0292491 A1 ‡ | 10/2015 | Haeusser | F04B 1/0408 92/172 |
| 2016/0076683 A1 ‡ | 3/2016 | Bishoff | F16L 29/007 137/511 |
| 2016/0229712 A1 ‡ | 8/2016 | Shmidt | C02F 1/003 |
| 2016/0327164 A1 * | 11/2016 | Tyers | F16K 1/12 |

FOREIGN PATENT DOCUMENTS

| | | | | |
|---|---|---|---|---|
| JP | 2014062605 A | ‡ | 4/2014 | |
| JP | 2014062605 A | | 4/2014 | |
| WO | 2006083504 A2 | | 8/2006 | |
| WO | WO-2006083504 A2 | ‡ | 8/2006 | C02F 1/008 |
| WO | 2007036634 A1 | | 4/2007 | |
| WO | WO-2007036634 A1 | ‡ | 4/2007 | C02F 1/42 |

OTHER PUBLICATIONS

Hydrus Valve Technical Manual, Kinetico Incorporated 2010, Product No. 12225B.‡

* cited by examiner
‡ imported from a related application

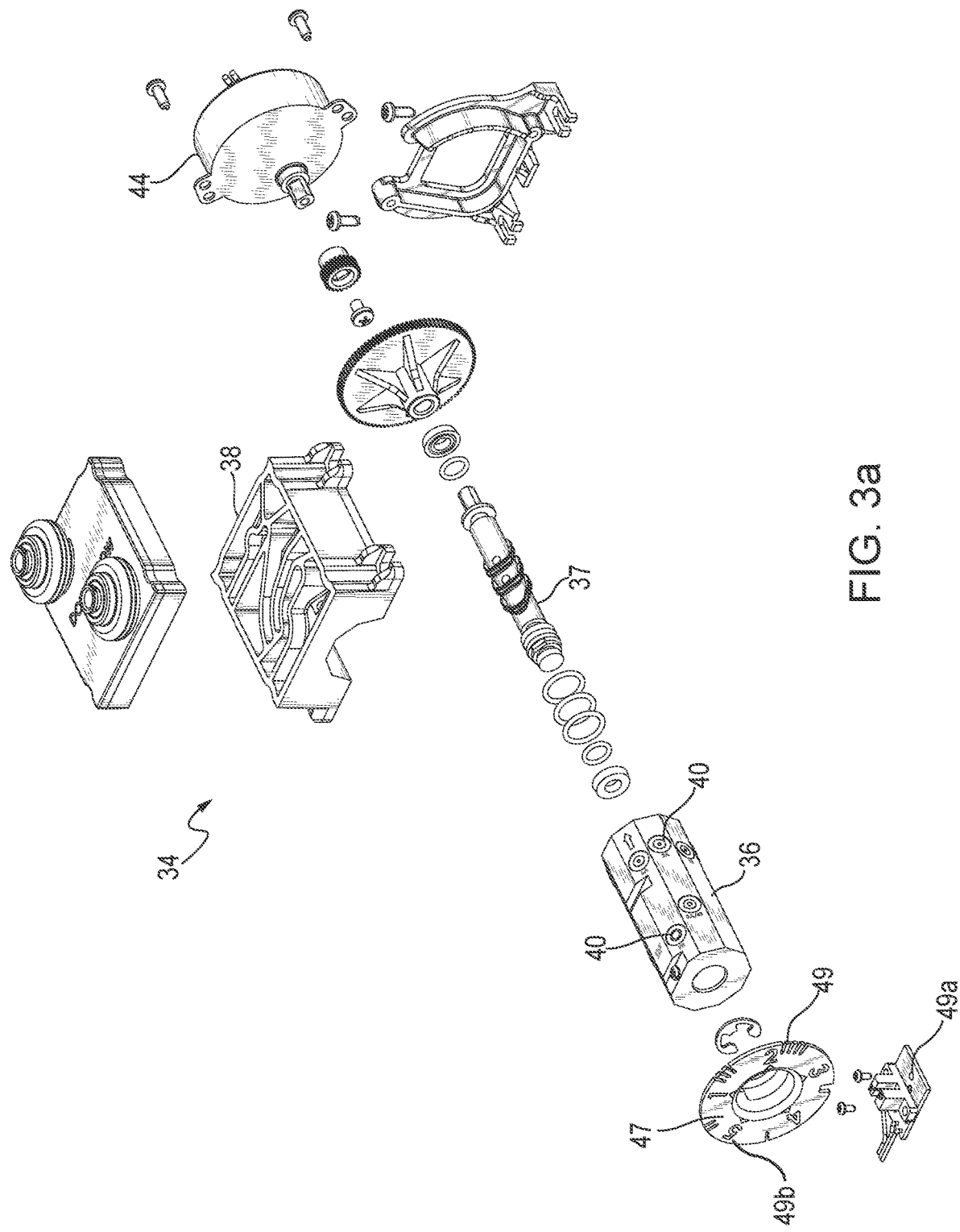

CONTROL VALVE FOR FLUID TREATMENT APPARATUS

RELATED APPLICATION

This application is a divisional of, and claims priority under 35 USC 120 from U.S. Ser. No. 15/282,452 filed Sep. 30, 2016 and which claims priority under 35 USC 119 from U.S. Provisional Application Ser. No. 62/245,751 filed on Oct. 23, 2015 which is incorporated by reference.

BACKGROUND

The present invention relates generally to fluid flow control systems, and more specifically to a water softener control valve.

Water softener control valves often use pistons equipped with radial ring seals to control flow in a cylinder of the valve. Such controls are used to periodically seal off certain flow paths and open others, under the control of a timer portion of the control valve. As is known in the art, such softeners periodically cycle between service, backwash, brine rinse, slow rinse, fast rinse, brine refill and other operations well known to designers of such equipment. Operation of such valves is described in U.S. Pat. Nos. 8,302,631; 6,644,349 and 6,176,258, all of which are incorporated by reference.

There is a need for an improved fluid treatment apparatus control valve which is easier to manufacture and assemble.

SUMMARY

The above-identified need is met by the present water treatment control valve, which is particularly suited for use in commercial style water softeners. Features included on the present control valve include an improved piston valve and cylinder assembly, which enhances fluid shutoff without generating cavitation forces that potentially impair a properly sealed shutoff of flow. This construction includes upper and lower piston valve portions sandwiching a resilient seal, and having a toothed periphery to allow pressure bleed-off as the piston valve closes. The cylinder is also preferably provided with formations for guiding the piston valve into position and for reducing abrupt pressure variations.

Another feature is that a lower, tank adapter portion is secured to a lower end of a control valve body by an easily removable clamp, and fluid connections between the two portions are sealed by a plurality of radial seals. The present control valve also features a vacuum breaker integrally molded with the tank adapter portion and being in direct communication with the treatment tank. Similarly, a pressure relief valve is also integrally molded into the tank adapter portion of the valve. Selected ports of the valve body are provided with clips configured for facilitating connection and disconnection of associated nipple fittings. Further, at an upper end of the valve body, opposite the tank adapter portion, a spool controller is integrally connected to a cap for routing control water and thus controlling movement of the piston valves. In addition, the tank adapter portion is provided with easily convertible upflow/downflow adapter fittings for changing the direction of fluid flow during operational cycles.

More specifically, a control valve is provided for a fluid treatment apparatus, including a housing with at least one cylinder defining a fluid flow path in the apparatus, each cylinder having an associated reciprocating piston valve. The valve includes a first piston valve half; a second piston valve half complementary to the first piston valve half; and a resilient seal constructed and arranged for being sandwiched between the first and second piston valve halves. The first piston valve half is constructed and arranged for engaging the cylinder before the second piston valve half, and has an exterior peripheral edge defined by a plurality of peripherally spaced teeth creating flow spaces between the teeth.

In another embodiment, a control valve for a fluid treatment apparatus is provided, including a valve body having a control portion and a treatment portion, the portions being separated from each other so that fluid in the control portion is isolated from fluid in the treatment portion. The treatment portion includes a plurality of piston valves reciprocating in corresponding cylinders for controlling water to be treated in the apparatus, ends of each piston valve being disposed in the control portion. A tank adapter engageable on an end of the valve body opposite the control portion, the tank adapter defining a plurality of seats corresponding to the cylinders, each seat dimensioned for receiving a corresponding one of said cylinders. A resilient annular seal is sealingly disposed in the seats for preventing fluid passage between the cylinder and the tank adapter. A clamp joins the tank adapter to the valve body.

In still another embodiment, a control valve is provided for a fluid treatment device, and includes a valve body having a control portion and a treatment portion, the portions being separated from each other so that fluid in the control portion is isolated from fluid in the treatment portion, the treatment portion including a plurality of piston valves reciprocating in corresponding cylinders for controlling water to be treated in the apparatus, and ends of each piston valve are disposed in the control portion. A tank adapter is engageable on an end of the valve body opposite the control portion. The tank adapter defines a plurality of seats corresponding to the cylinders, each seat dimensioned for receiving a corresponding one of said cylinders. At least the valve body is connected to the tank adapter using resilient seals at connections of flow passageways for preventing leaks to obtain a gasket-free connection of the body to the adapter.

BRIEF DESCRIPTION OF THE DRAWINGS

FIG. 3A is an exploded perspective view of the present spool controller for the present valve shown in FIG. 3;

DETAILED DESCRIPTION

Figure 1:
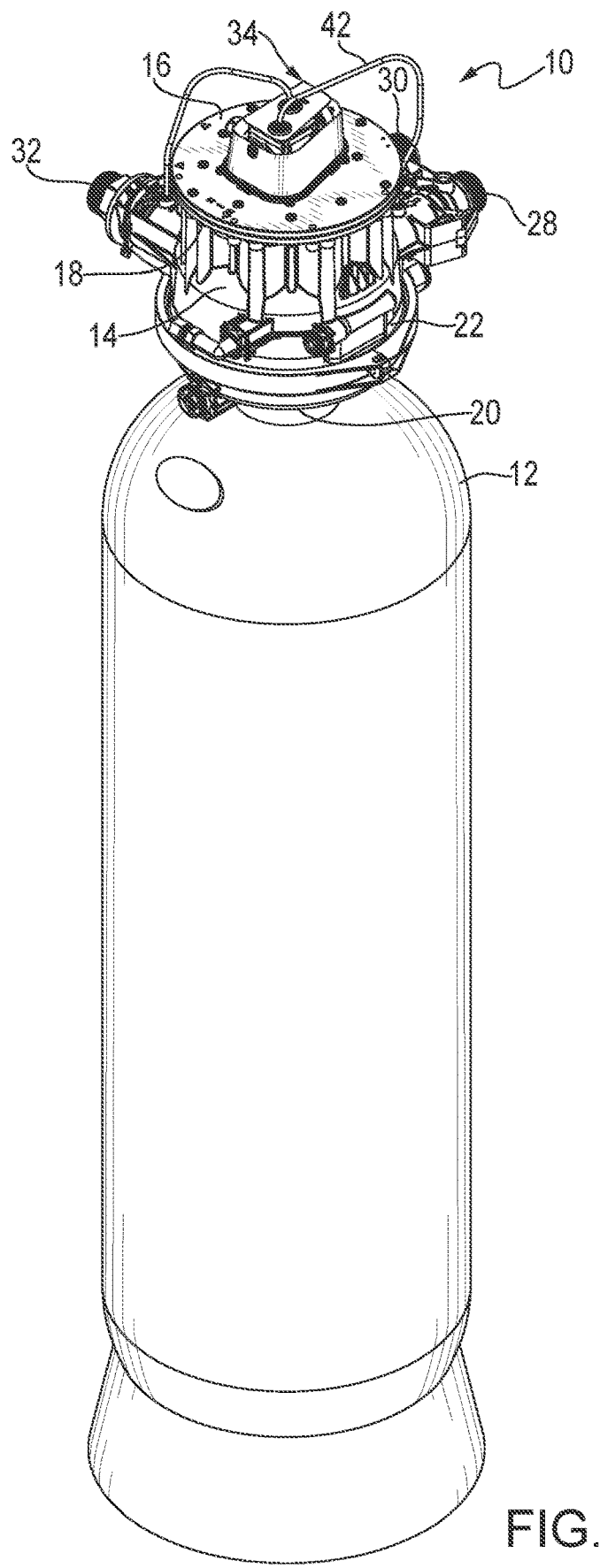
FIG. 1 is a top perspective view of the present control valve mounted on a treatment tank.
Figure 2:
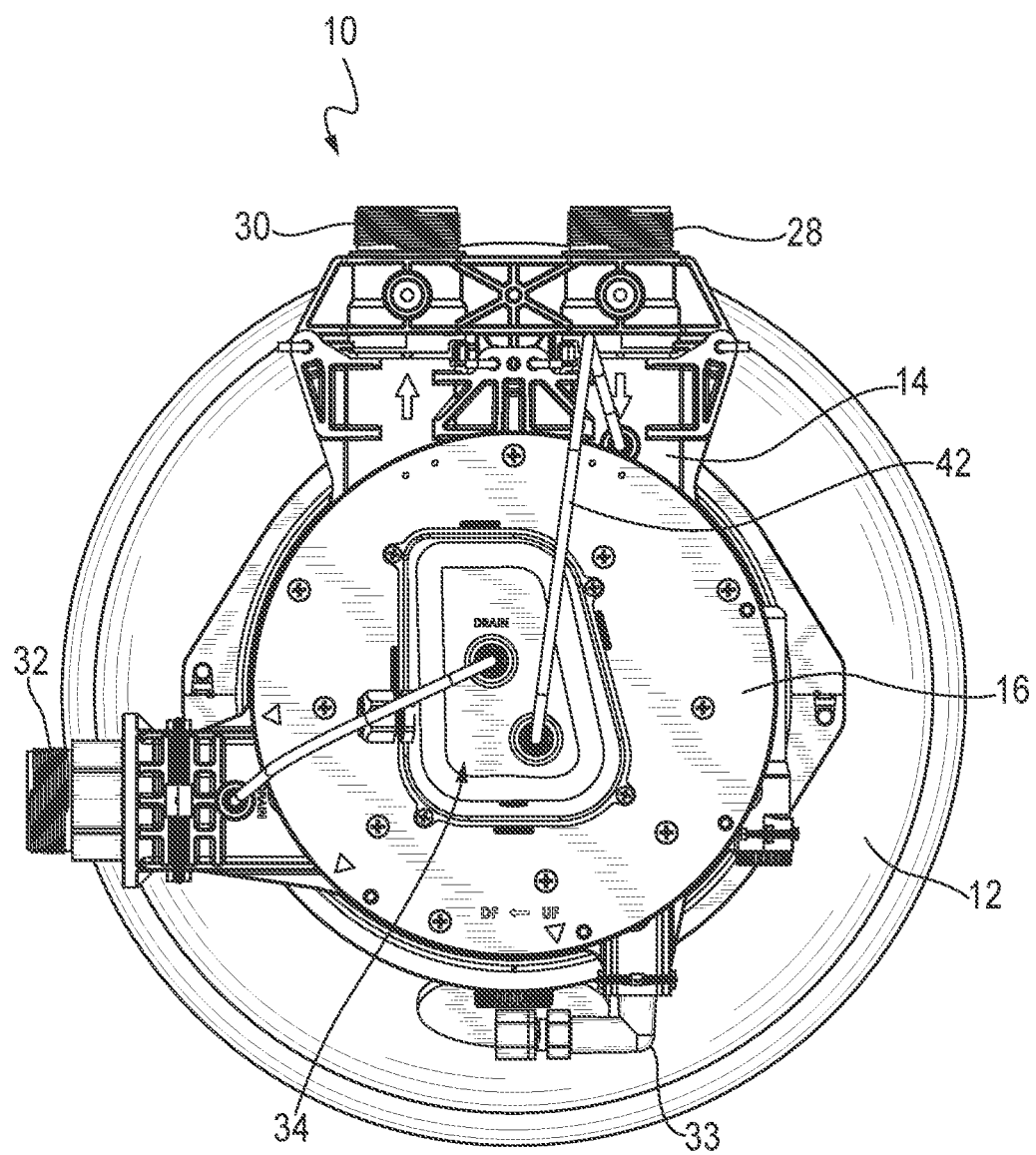
FIG. 2 is an overhead plan view of the control vale of FIG. 1.
Figure 4:
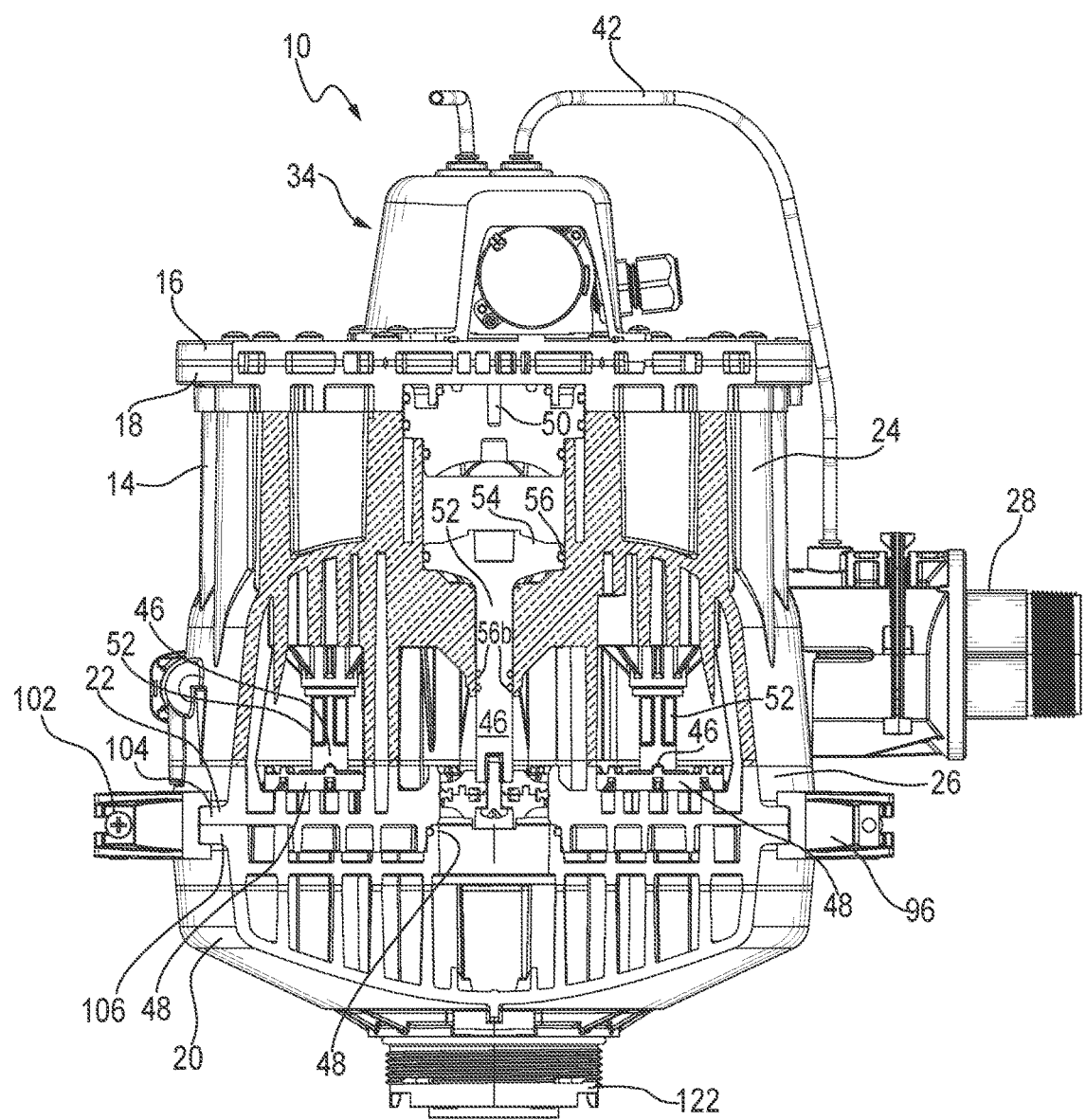
FIG. 4 is a fragmentary vertical cross-section of the present control valve in a piston closed position.

Referring now to FIGS. 1, 2 and 4, a control valve, generally designated 10 is provided for use in controlling fluid flow in a fluid treatment apparatus, generally designated 12. In the preferred embodiment the treatment apparatus is a water softener and the tank 12 is a resin tank, however other types of water filtration or fluid treatment devices are contemplated. Also in the present discussion, "fluid" is intended to mean any type of flowing liquid, but preferably refers to water.

The present control valve 10 has a valve body 14 with a valve body cap 16 mounted to an upper end 18, and a tank adapter 20 mounted to a lower end 22 of the valve body. In addition, the valve body 14 has an upper or control portion 24 located closer to the cap 16 than to the tank adapter 20, and a treatment portion 26 located closer to the tank adapter than to the cap. In a normal operating position, the control portion 24 is located above the treatment portion 26, and there is no fluid communication between the control portion and the treatment portion so that the control fluid is isolated and maintained separate from the treatment fluid. As is well known in the water softening art, the control valve 10 has an inlet port 28, an outlet port 30, a drain outlet port 32 and a brine inlet port 33.

Figure 3:
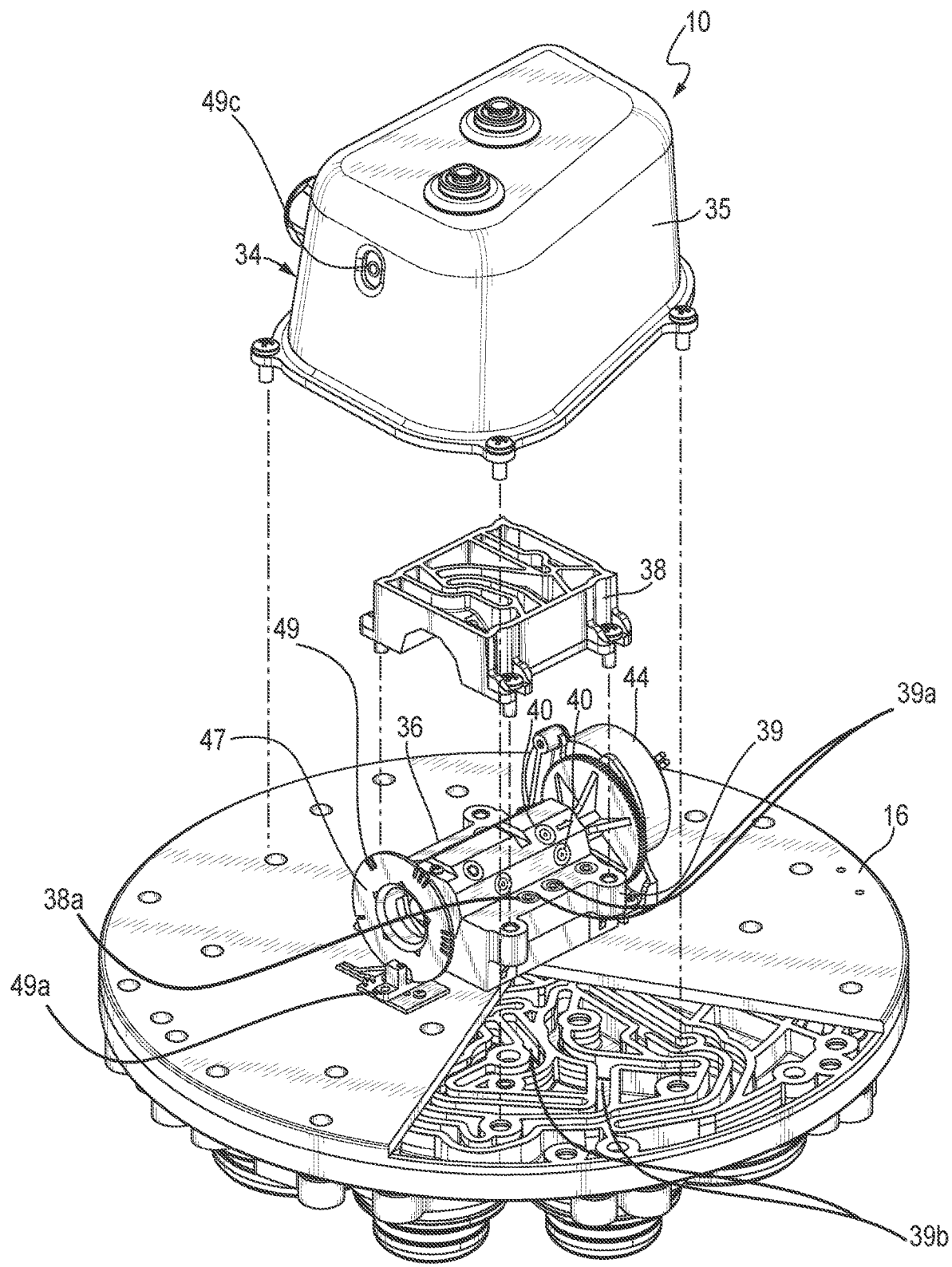
FIG. 3 is an exploded top perspective view of the pilot valve of the present control valve.

Referring now to FIGS. 3, 3A and 4, the cap 16 is provided with a spool controller 34 including a housing 35 enclosing a spool body 36 enclosing a rotating spool 37 and being held in a bracket 38. It is preferred that a lower portion 39 of the bracket 38 is integrally secured to the cap 16, as by ultrasonic welding, heat staking, chemical adhesive, or the like. The spool 36 has a plurality of flow ports 40 that are used to control fluid flow received from a pilot line 42 which draws a portion of fluid flow from the inlet port 28 and directs the flow into the spool controller 34. The preferable hexagonal vertical cross-sectional shape of the spool body 36 is complementary to corresponding portions of the spool bracket 38 and the lower portion 39. This construction enables a single seal member, preferably an O-ring 38a to provide a leak-free connection between the spool body 36, the bracket and the lower portion 39. An advantage of this construction is the ability to avoid multiple individual tubing and fitting connections, and the use of gaskets, which are prone to leakage. In other words, the housing portions 38 and 39 are placed in fluid communication with the spool body 36 without the use of gaskets, with mechanical fasteners holding the parts together, and the leak protection being provided by the resilient seals (O-rings) 38a.

A clock or timer mechanism 44 rotates the spool 36, and thus directs pilot fluid flow to a designated one of a plurality of piston valves 46, each reciprocating in a designated cylinder 48. In the preferred embodiment, there are eight piston valves 46, however the number of valves may vary to suit the application. Also, an indicator wheel 47 secured to an end of the spool 37 for common rotation has apertures or slots 49 in various arrangements on its peripheral edge for coordination with an opto-sensor 49a or the like connected to a main control valve printed circuit board (PCB) (not shown) for coordinating the various operational stages of the valve 10. In addition, the position of apertures 49 on the wheel 47 as well as optional numerical indicators 49b (FIG. 3a) is visible by an operator through a window 49c in the housing 35 so that the operator can monitor the operational status of the valve 10.

In the preferred embodiment, the lower portion 39 of the bracket 38 has internal flow passages 39a (FIG. 3) that are in fluid communication with corresponding passages 39b in the cap 16. Pilot flow is directed through engagement fittings such as flow channels or ports 50 (FIG. 4) located in the cap 16, and each flow channel is associated with a particular cylinder 48. The movement of the piston valves 46 in the respective cylinders 48, through action of the pilot flow from the spool controller 34, causes the control valve 10 to cycle between the various known water softener operational positions which are well known in the art. Such cycle operations include service, backwash, brine rinse, slow rinse, fast rinse, brine refill and the like, described in greater detail in the patents referenced above.

It should be noted that the movement of the piston valves 46 is controlled by the spool controller 34 using only the pilot flow of fluid. Also, the pilot flow of fluid remains in the control portion 24 and as described above, does not mix with the fluid in the treatment portion 26 of the valve body.

Referring now to FIGS. 4-13, an important feature of the present control valve 10 is that the piston valves 46 and the associated cylinders 48 are constructed and arranged to dampen the sometimes abrupt pressure changes which occur when treatment fluid flow is redirected within the valve, during operational cycle changes.

Each piston valve 46 includes a main shaft 52 having an upper flange 54 located in the control portion 24 and configured for periodically receiving pilot flow from the spool controller 34. At least one radial seal 56, such as an "O"-ring or the like seals the area of the cylinder 48 below the flange from access to the control portion 24 and any control fluid. In the preferred embodiment, multiple "O"-rings 56b are also provided to separate the control portion 24 from the treatment or flow portion 26. Opposite the upper flange 54, the piston valve 46 is provided with a first piston valve half 58, a second piston valve half 60 complementary to the first piston valve half, and a resilient seal 62 constructed and arranged for being sandwiched between the first and second piston valve halves. Each of the first and second valve halves has a common diameter and combines to define a pocket 64 for accommodating the resilient seal 62.

Figure 10:
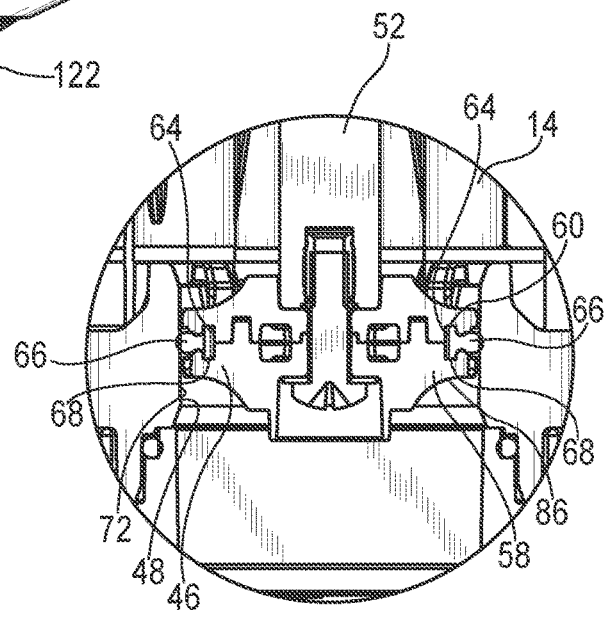
FIG. 10 is an enlarged fragmentary side elevation of the piston and cylinder engagement in the present control valve.

Referring to FIGS. 7-13, in the preferred embodiment, the resilient seal 62 has a generally "T"-shaped vertical cross-section including a main body 66 and a pair of outwardly extending arms 68. The arms 68 are secured in the pocket 64 formed by respective portions of the first and second valve halves 58, 60. In addition, the body 66 extends radially from a peripheral edge 70 for creating a wiping seal with a cylinder wall 72 (FIG. 8) for preventing fluid flow into the cylinder 48 as the piston approaches and engages the cylinder (FIG. 10).

Figure 11:
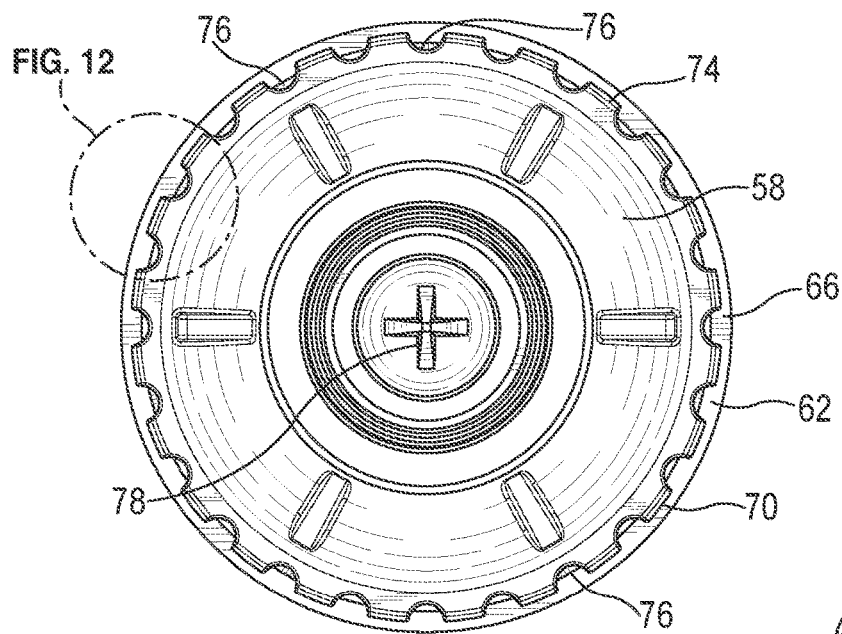
FIG. 11 is a bottom view of the present piston valve.
Figure 12:
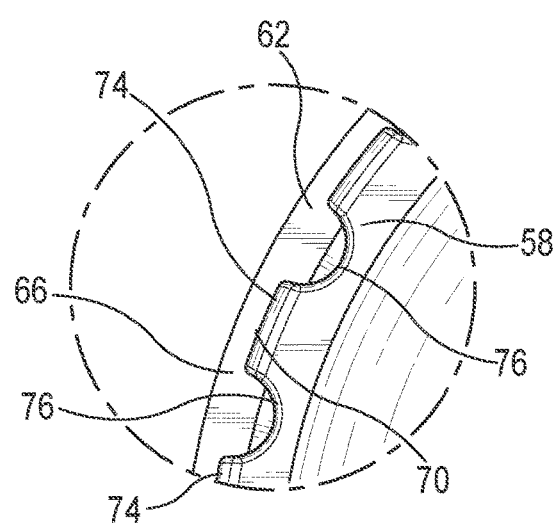
FIG. 12 is a fragmentary enlarged bottom view of the piston of FIG. 11.
Figure 13:
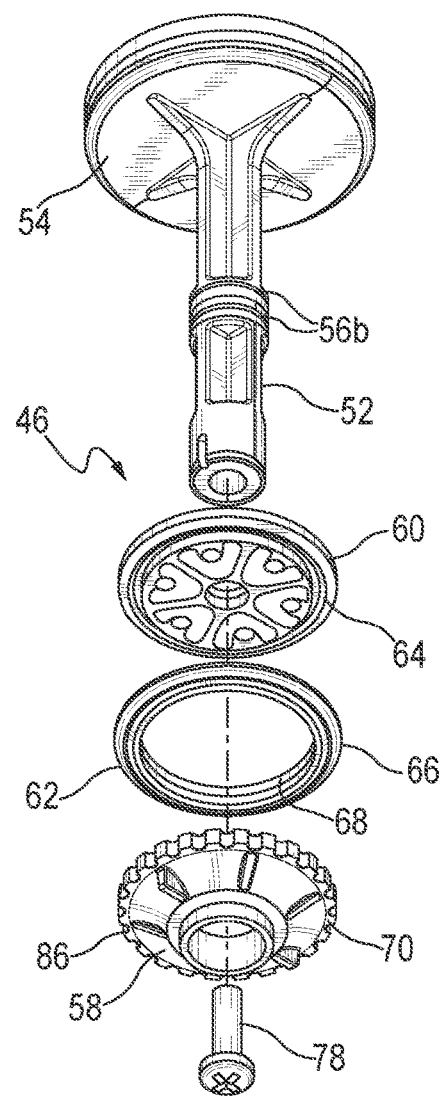
FIG. 13 is an exploded bottom perspective view of the present piston.
Figure 14:
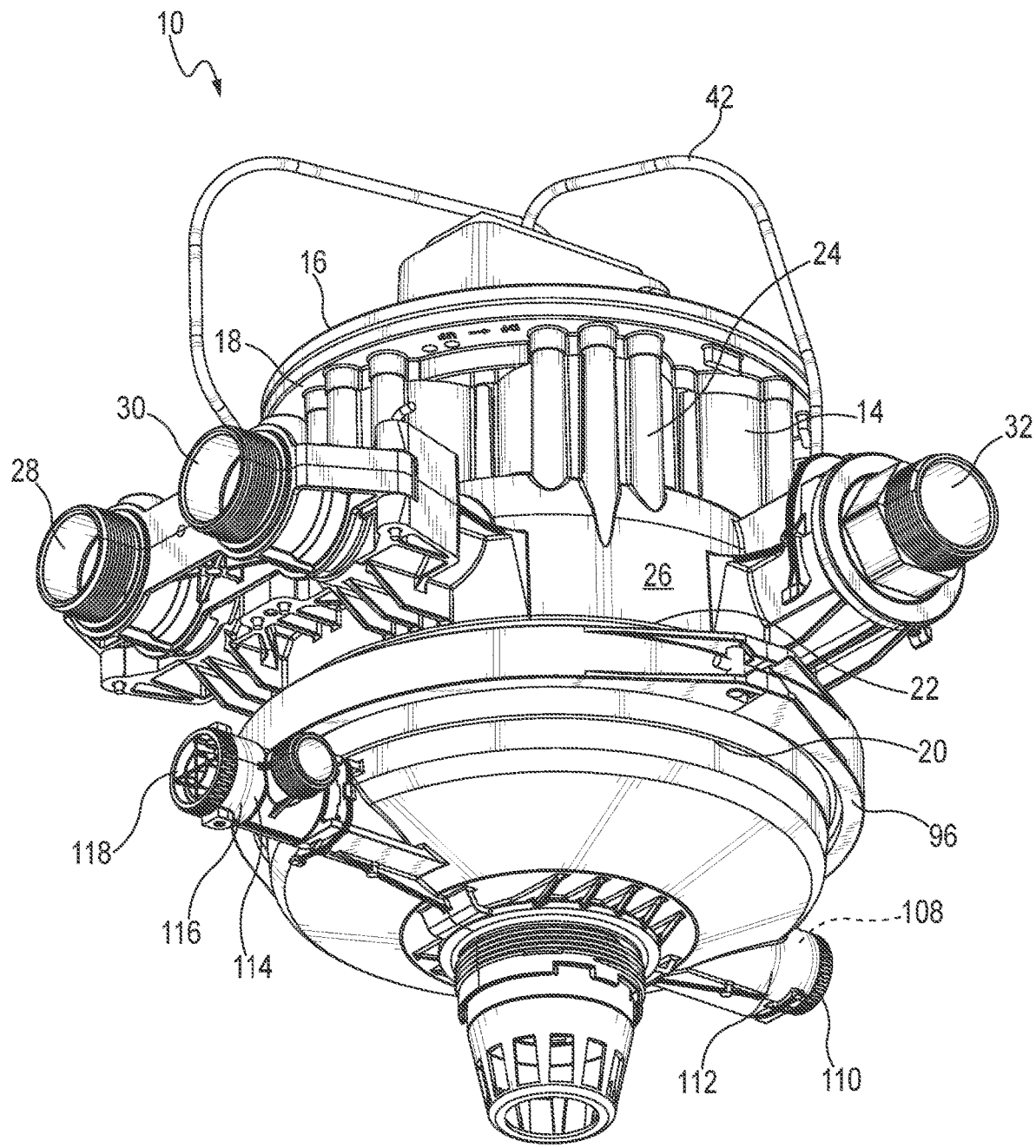
FIG. 14 is a bottom perspective view of the present control valve.

Another feature of the piston valve 46 is that the first piston valve half 58 is constructed and arranged for engaging the cylinder 48 before the second piston valve half 60, and the exterior peripheral edge 70 includes a plurality of peripherally spaced teeth 74 creating flow spaces 76 between the teeth (FIGS. 11 and 12). In the preferred embodiment the teeth 74 are regularly spaced, and comprise approximately half of the peripheral edge of the first valve half 58. This construction has been found to dampen the often abrupt pressure changes experienced in the valve 10 when the piston valve 46 seals the cylinder 48 during operation. Such pressure changes have been known to create disruptive cavitation to the extent that proper sealing of the cylinder 48 has been impaired. A suitable fastener 78, such as a threaded screw, secures the first and second halves 58, 60 and indirectly the resilient seal 62, to an end of the piston shaft 52 (FIG. 13).

Figure 7:
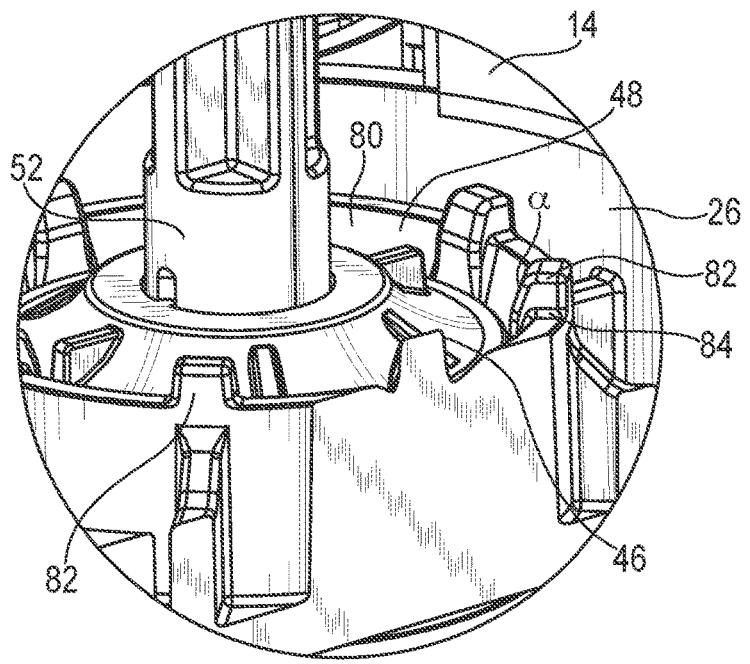
FIG. 7 is an enlarged fragmentary top perspective view of the valve of FIG. 6.
Figure 8:
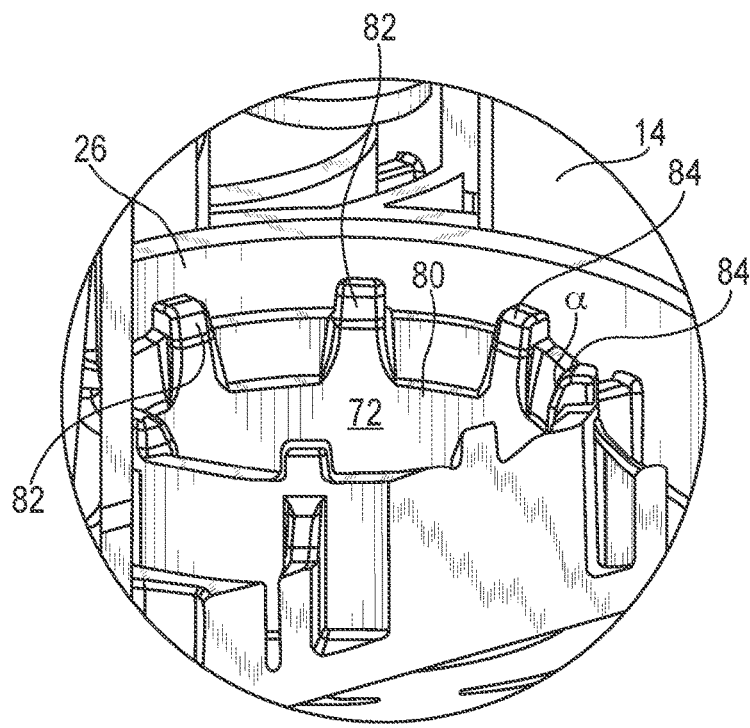
FIG. 8 is an enlarged fragmentary top perspective of the cylinder portion of the valve of FIG. 6.
Figure 9:
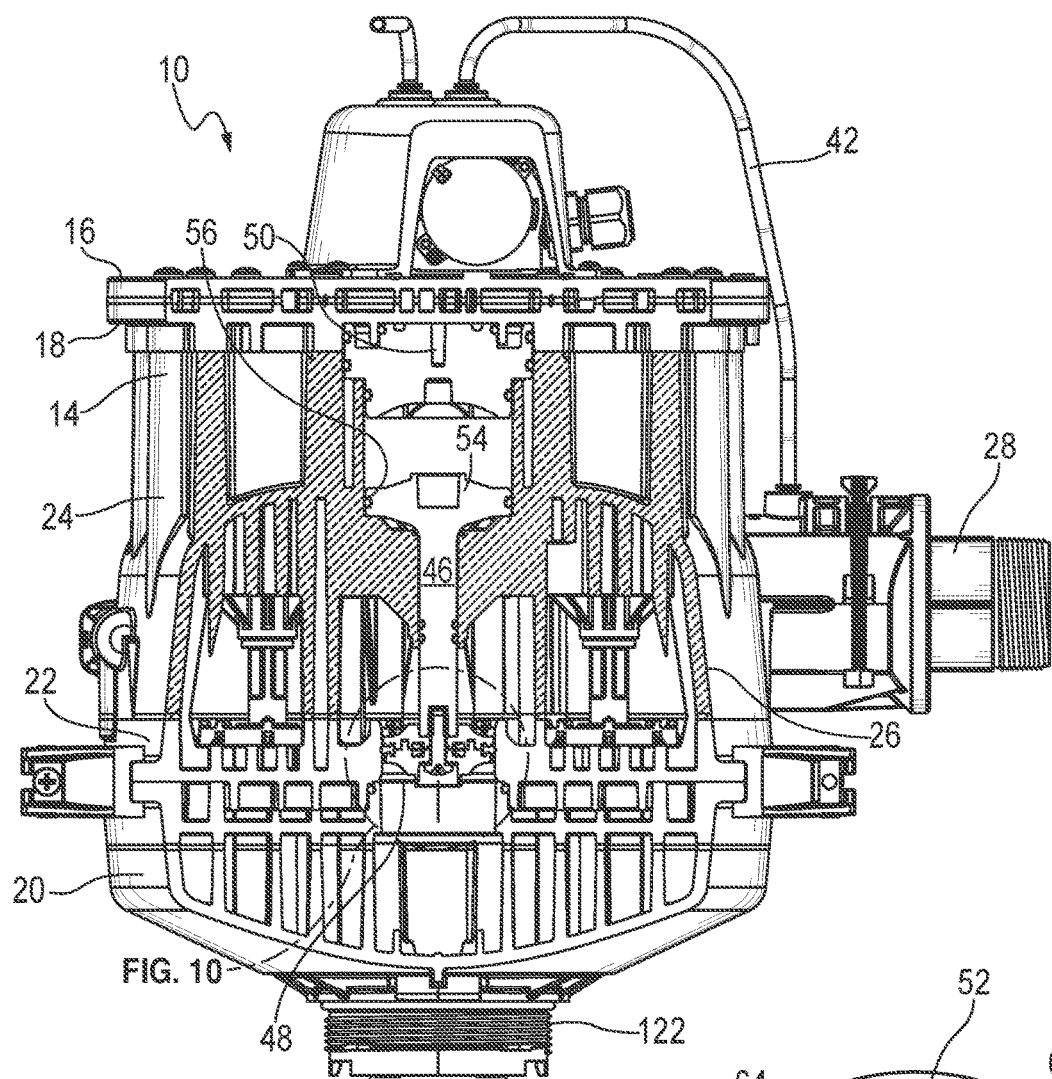
FIG. 9 is a side elevation and partial vertical cross-section of the present control valve.

Referring now to FIGS. 7 and 8, another feature of the present valve 10 is that each cylinder 48 includes a complementary opening 80 dimensioned for receiving the piston valve 46, and has a plurality of peripherally spaced guide ribs 82, each said rib having a beveled interior edge 84. The guide ribs project axially above the opening 80, facilitate engagement of the piston valve 46 with the opening and further reduce unwanted cavitation. It is further preferred that the beveled edge 84 defines an angle α, and the first piston valve half 58 defines a complementarily angled edge 86 (FIGS. 10, 13) for promoting piston guidance into the cylinder 48.

Figure 15:
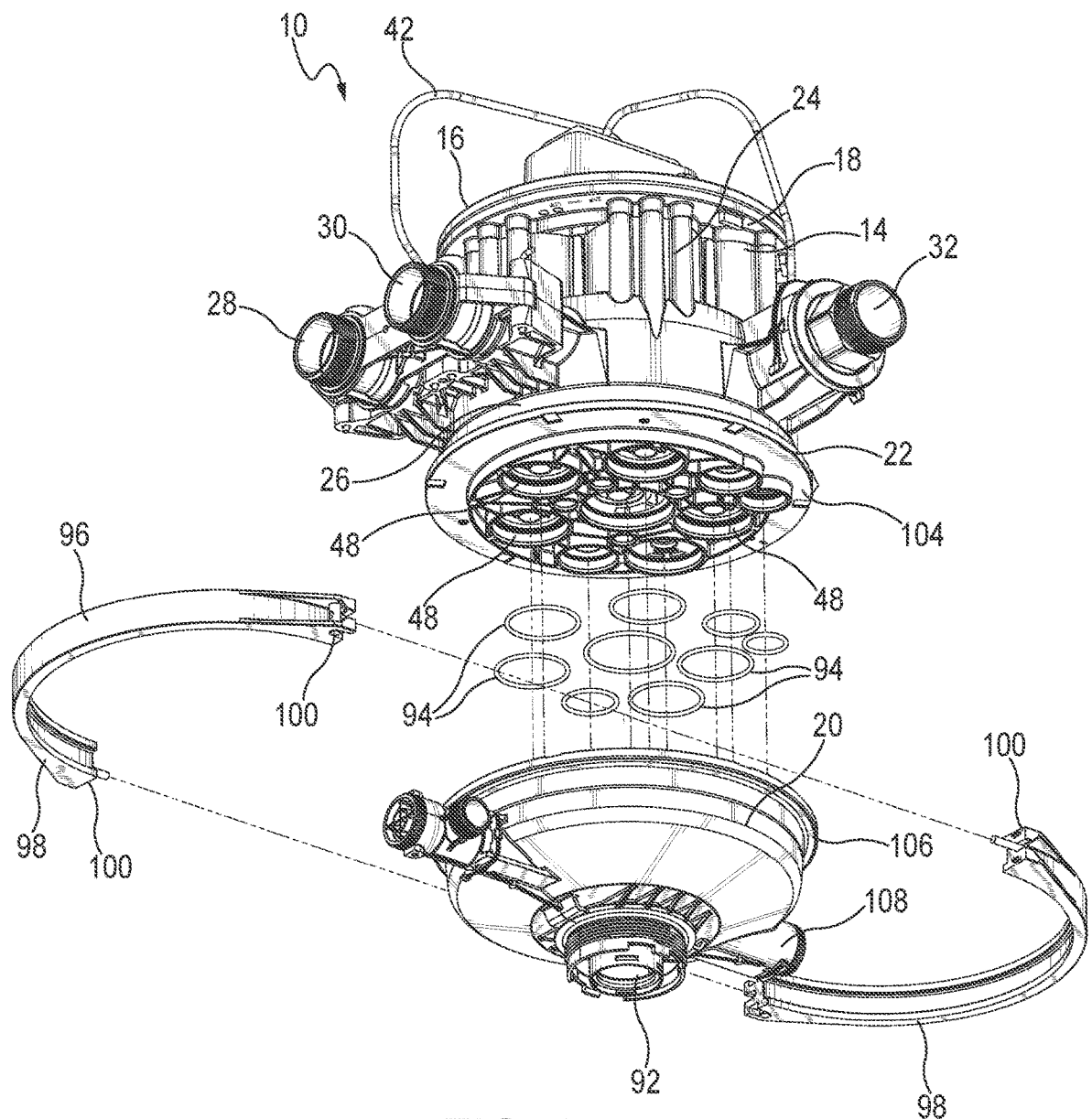
FIG. 15 is an exploded bottom perspective view of the present control valve.
Figure 16:
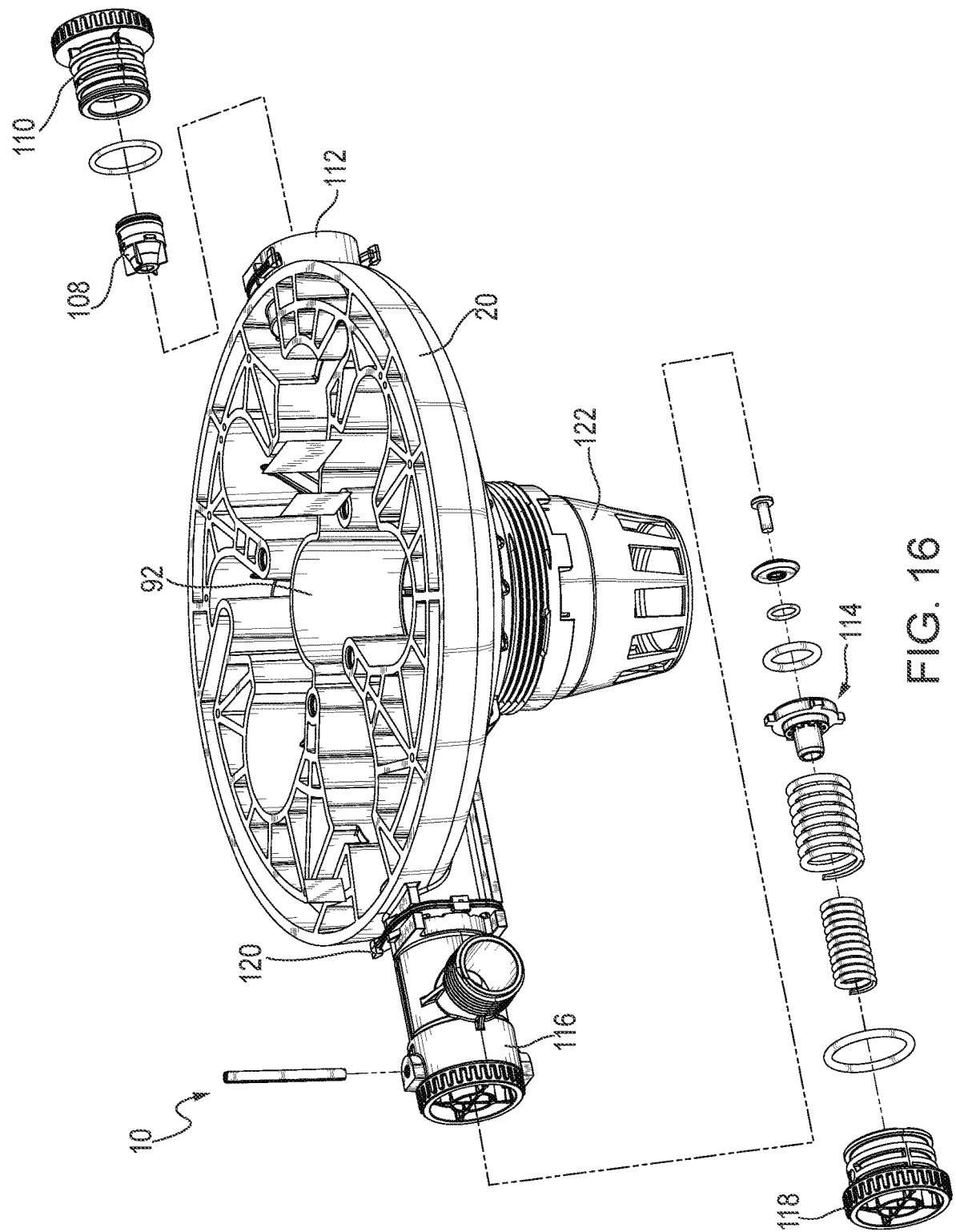
FIG. 16 is a fragmentary top perspective view of the tank adapter of the present control valve.
Figure 17:
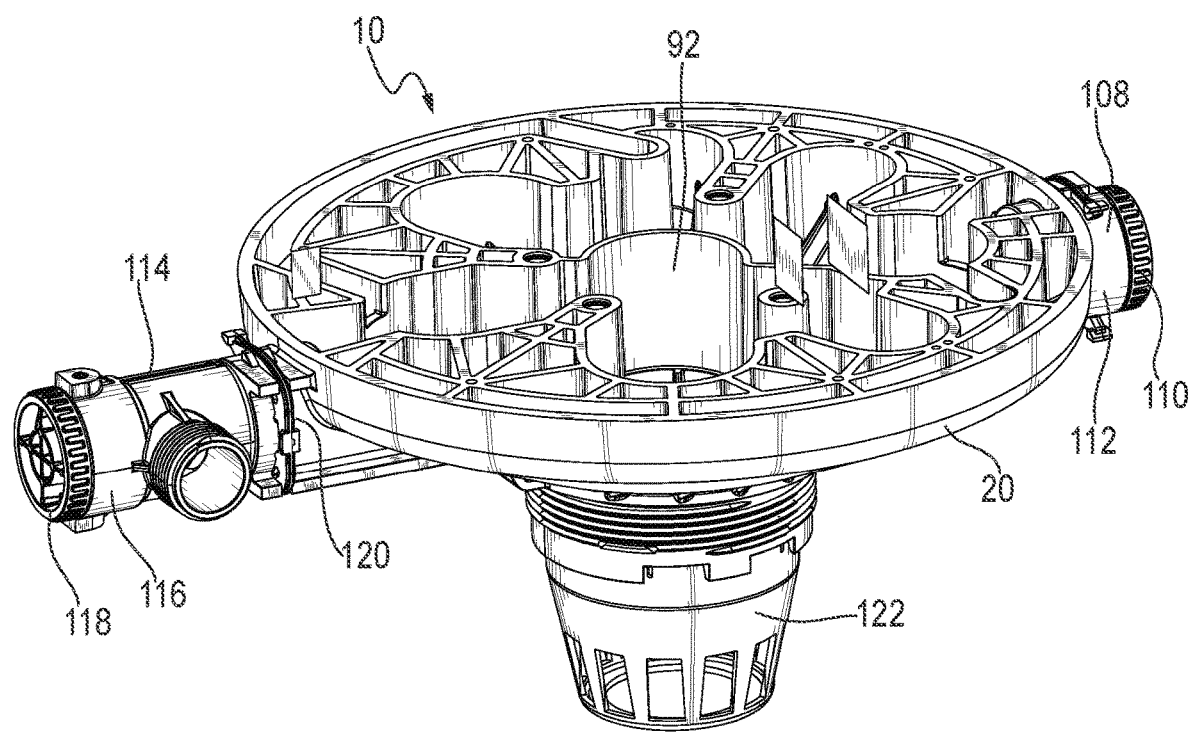
FIG. 17 is an exploded top perspective view of the tank adapter shown in FIG. 16.
Figure 18:
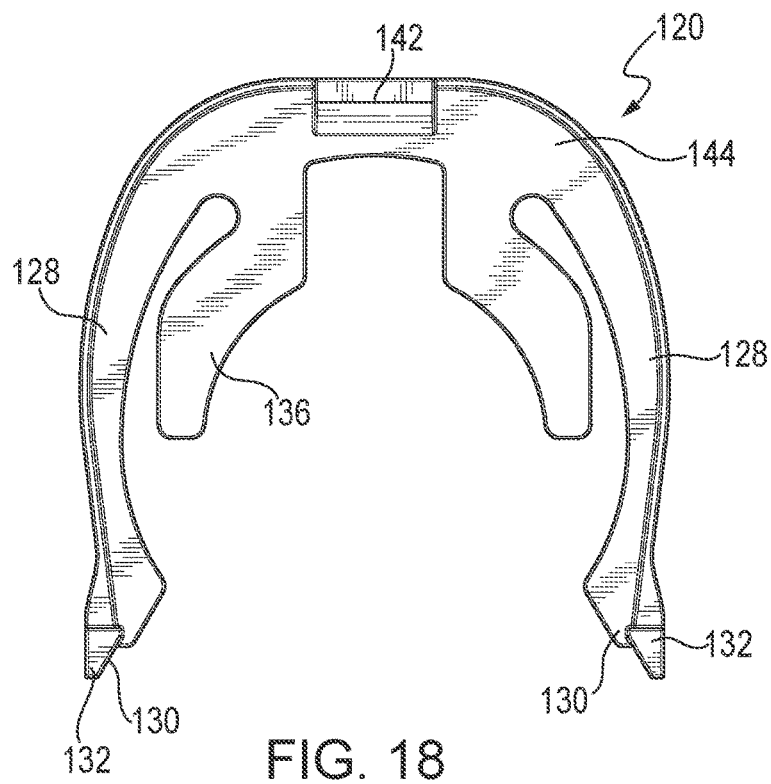
FIG. 18 is a front elevation of a clip used in the present control valve.
Figure 19:
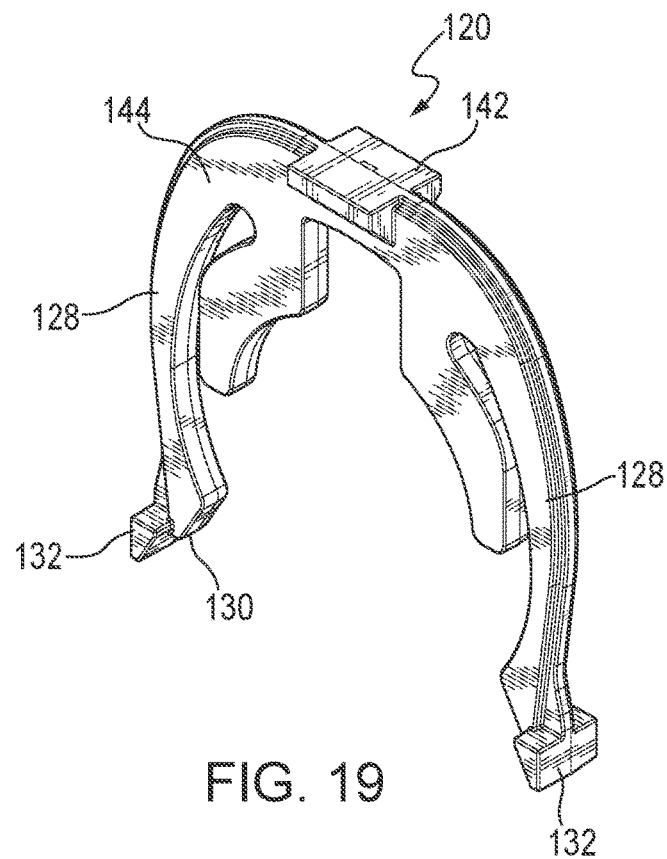
FIG. 19 is a top perspective view of the clip of FIG. 18.

Referring now to FIGS. 14-17 and 24, the tank adapter 20 defines a plurality of generally cylindrical seats 88 open to an upper surface 90 that is secured to the lower end 22 of the valve body 14. The seats 88 are part of a plate 91 (FIG. 24) joined to the tank adapter 20 by ultrasonic welding, hot plate welding, chemical adhesives or fasteners as known in the art. In FIGS. 16 and 17, the seats 88 are shown not attached to the tank adapter 20. Each of the seats 88 corresponds to and is in registry with an associated one of the cylinders 48. A central outlet aperture 92 permits fluid flow of treated fluid between the control valve 10 and the treatment tank 12. Furthermore, a resilient annular seal 94 such as an "O"-ring or the like (FIG. 15) is sealingly disposed in each seat 88 and circumscribes the cylinders 48 for preventing fluid passage between the cylinder 48 and the tank adapter 20 once the tank adapter is attached to the valve body 14. Also, through the use of the seals 94, the tank adapter 20 is connected to the lower valve body end 22 more simply and easily, without requiring a gasket. Thus, the same type of resilient seals around flow passages and gasket free attachment system described above relating to the spool controller 34 is employed in attaching the valve body 14 to the tank adapter 20.

Figure 5:
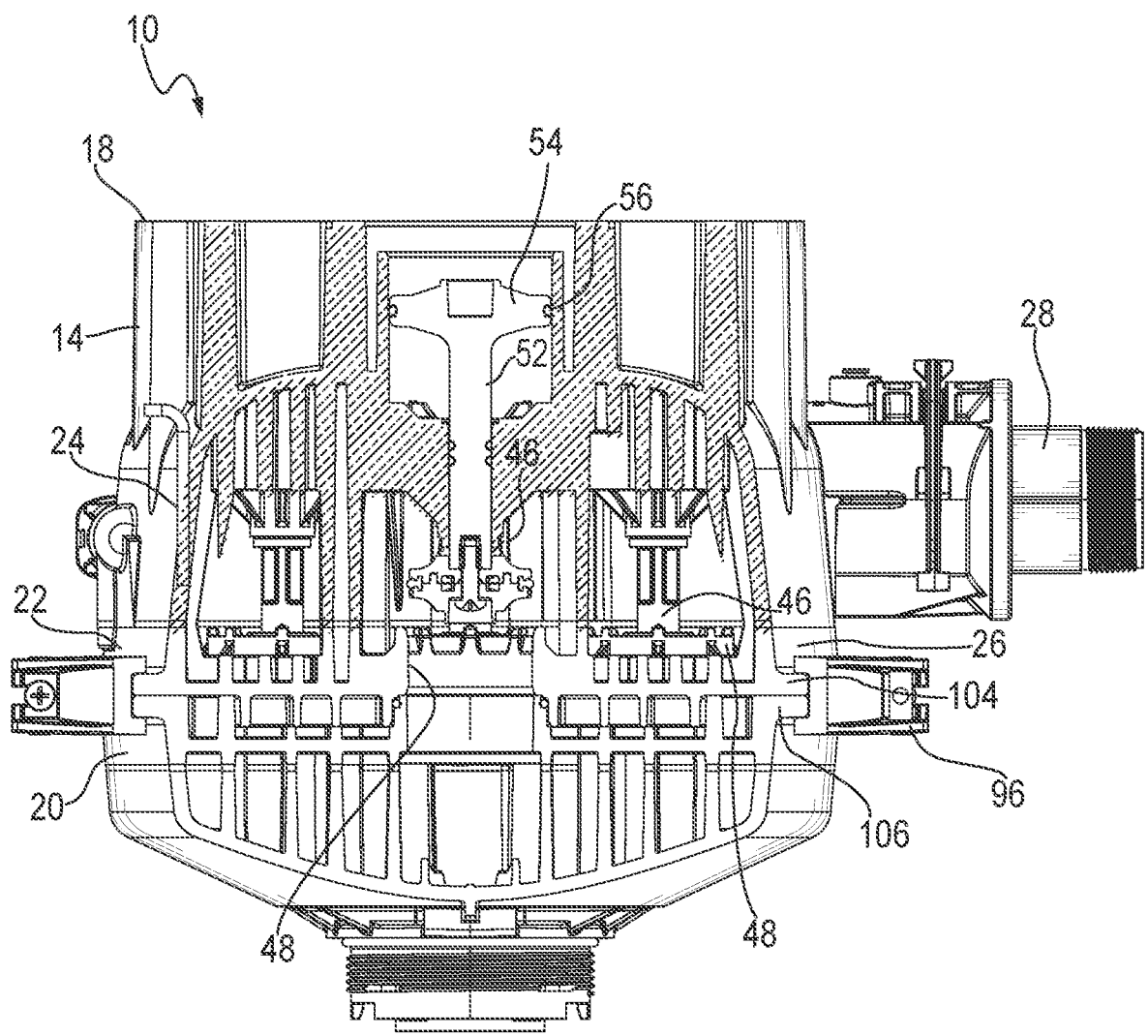
FIG. 5 is a fragmentary vertical cross-section of the present control valve in a piston open position.
Figure 6:
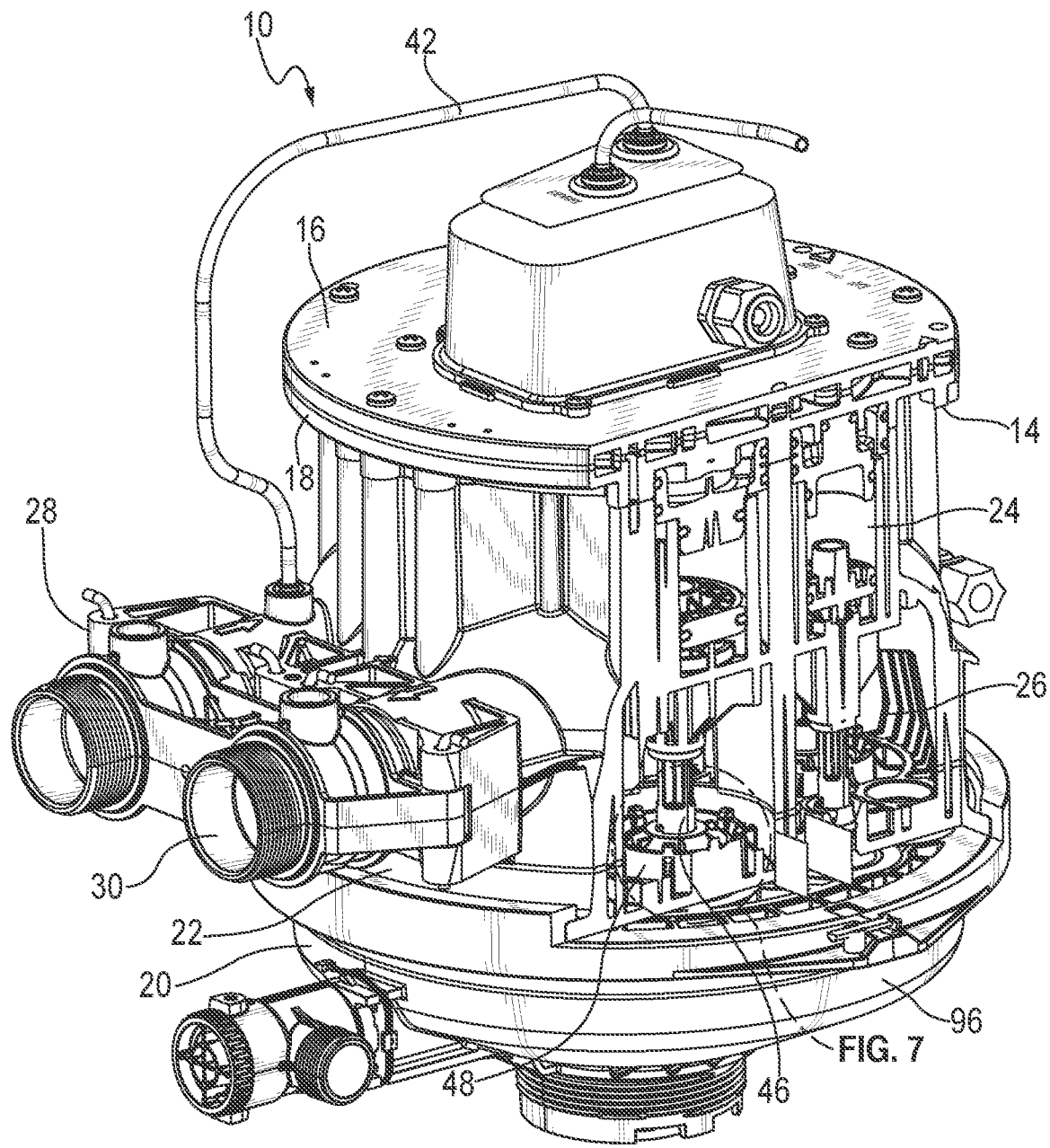
FIG. 6 is a top perspective view of the present valve in partial vertical cross-section.

Referring now to FIGS. 4, 5 and 15, the above-described attachment between the tank adapter 20 and the valve body 14 is further simplified by being accomplished by a single clamp 96 joining the tank adapter to the valve body. A feature of the present valve 10 is that the tank adapter 20 is secured to the valve body 14 solely by the clamp 96. As seen in FIG. 15, the clamp 96 is provided in two "C"-shaped portions 98 joined at opposing free ends 100 using fasteners 102 such as screws or the like (FIG. 4). Also, as seen in FIG. 15, clamping engagement of the tank adapter 20 to the valve body 14 is preferably achieved by the clamp 96 securely engaging and axially compressing respective radially extending flanges 104, 106 of the treatment portion 26 of the valve body 14 and the tank adapter 20. With this arrangement, since the connection is not exposed to water pressure, the control valve 10 can be fabricated with lighter materials to save cost, while still maintaining a strong connection to the valve adapter 20. Further, the single clamp 96 is easy to disassemble and yet securely holds the valve body 14 to the tank adapter 20.

Referring again to FIGS. 16 and 17, another feature of the present control valve 10 is that a vacuum breaker 108 is associated with the tank adapter 20, and preferably is integrally molded with the tank adapter and in fluid communication with the tank 12. This communication is through the central outlet aperture 92. In conventional control valves, vacuum breakers are provided to protect the valve and treatment device from vacuum damage resulting when the fluid supply is turned off. In some cases, the elevation from sea level of the installation is a factor in such vacuum damage. Conventionally, one breaker is provided upstream of the valve and/or downstream to protect the tank from collapsing during operation of the valve. By being in direct communication with the tank, as in the present valve 10, only one vacuum breaker 108 is needed. The present vacuum breaker 108 is held in place with a plug 110 engaged in a designated port 112 and held in place by a clip as described below in relation to FIGS. 18-21.

A pressure relief valve (PRV) 114 is also mounted to the tank adapter 20. The PRV 114 is provided to prevent damage to the valve 10 caused by pressure spikes resulting from rapid turning on or off of fluid under pressure. As seen in FIGS. 16 and 17, the valve 114 is enclosed within a valve housing 116 having a plug 118 at an open end. Opposite the plug 118, the valve housing 116 is secured to the tank adapter 20 using a clip 120, described in greater detail below. While other positions are contemplated, in the preferred embodiment, the PRV 114 is disposed on the valve adapter 20 diametrically opposite to the vacuum breaker 108. Upon assembly, the valve 10 with the tank adapter 20 is secured to the treatment tank 12 through threaded engagement with a depending tank fitting 122.

Figure 20:
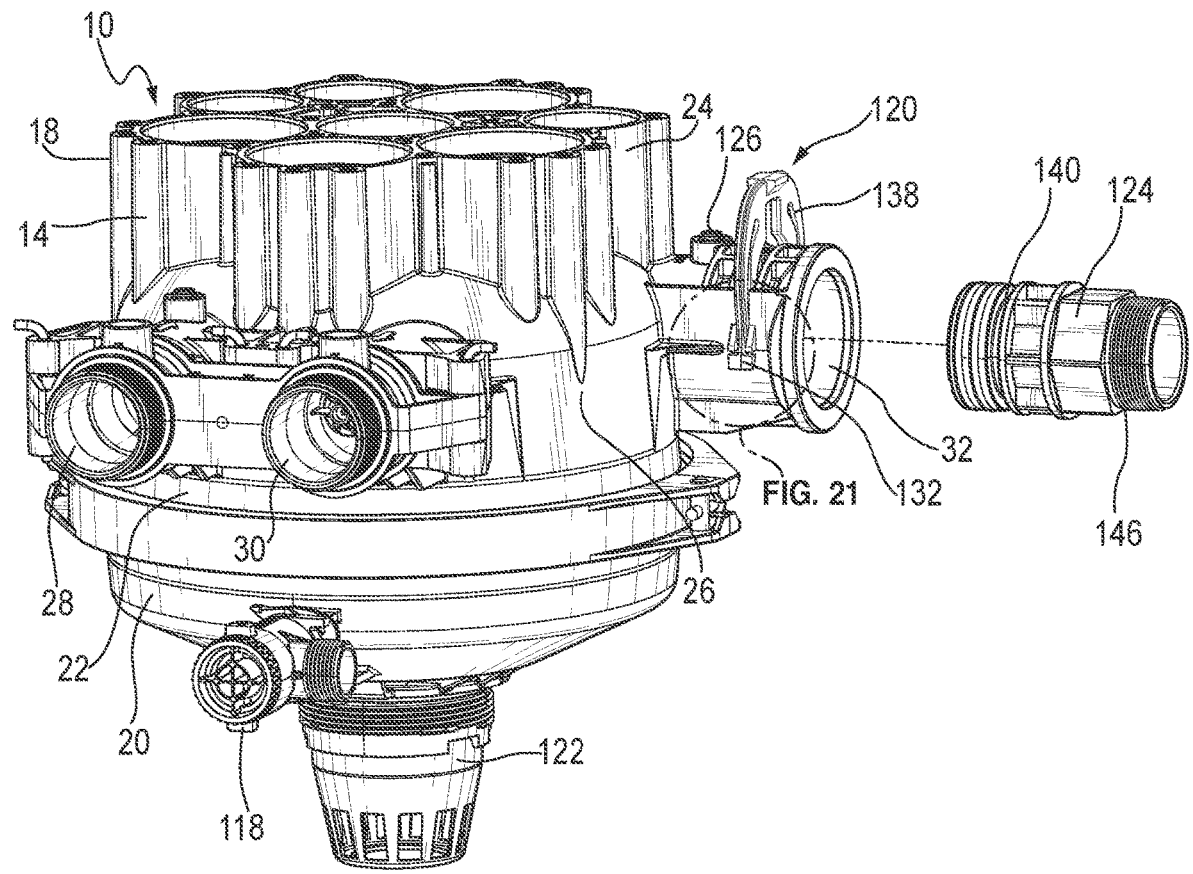
FIG. 20 is an exploded side perspective view of the present control valve showing engagement of the clip of FIGS. 18 and 19.
Figure 21:
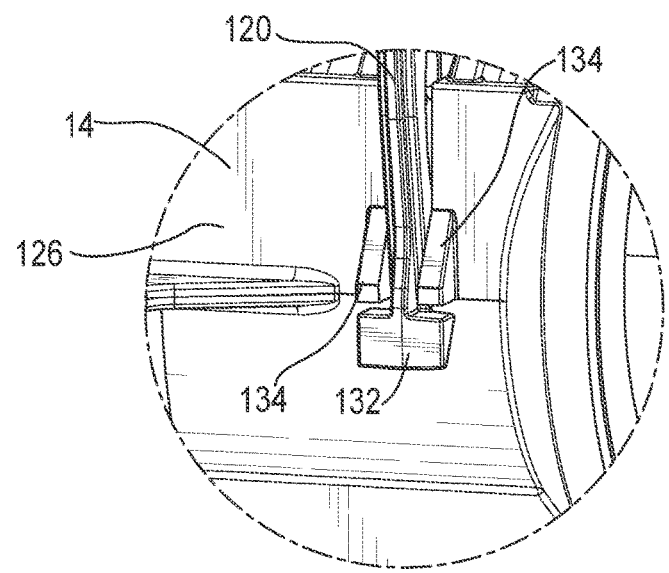
FIG. 21 is an enlarged fragmentary perspective view of the clip shown in FIG. 20.
Figure 24:
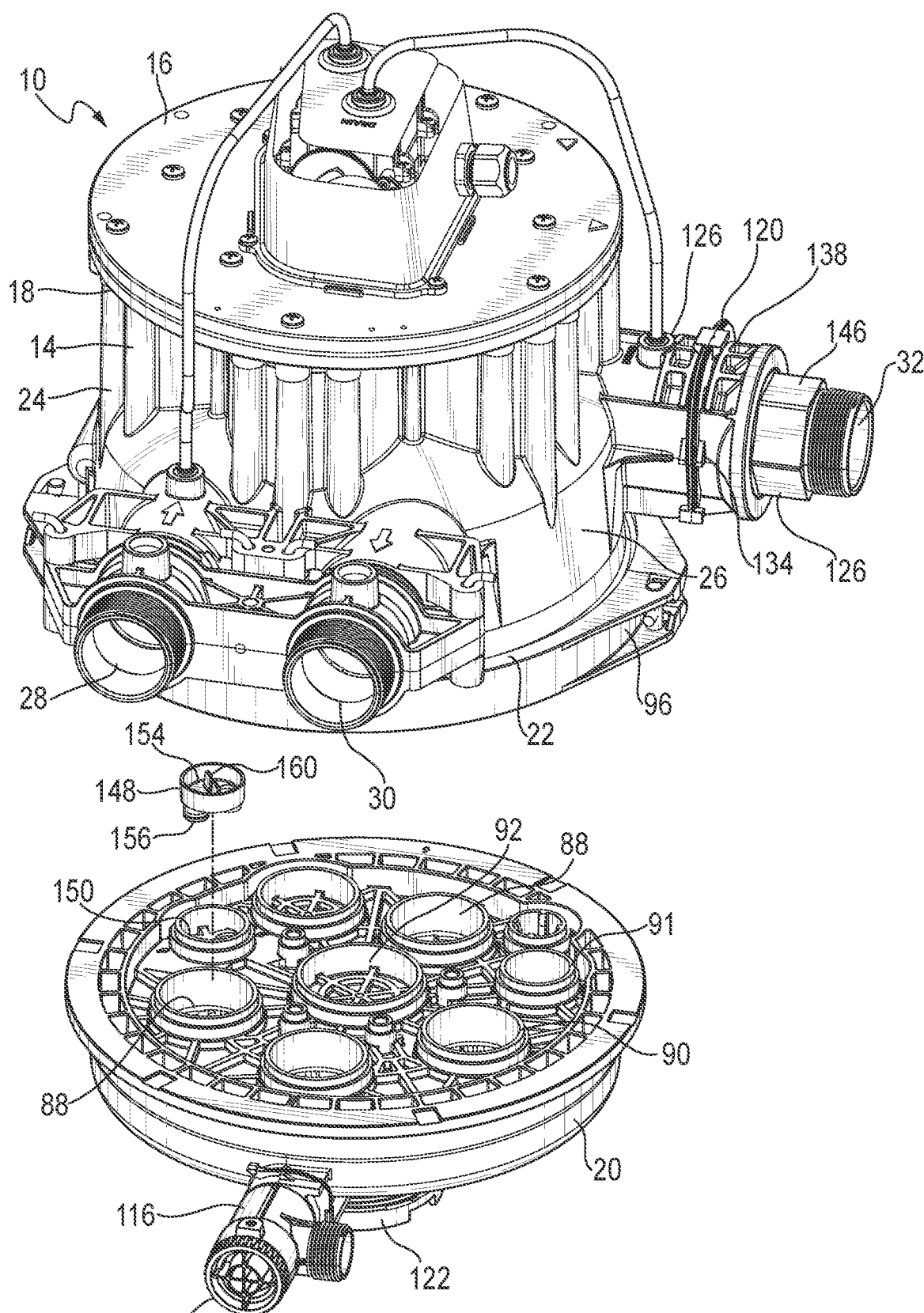
FIG. 24 is an exploded top perspective view of the present control valve showing the positioning of the cap of FIGS. 22 and 23.

Referring now to FIGS. 18-21 and 24, still another feature of the present control valve 10 is that quick, secure connection of input and/or outlet conduits or other accessories having connection nipple fittings 124 is achieved using the releasable, retained clip 120. Each clip 120 is used to connect a nipple fitting 124 to an associated port 126 on the valve body 14 or on the tank adapter 20, and is movable between a release position (FIGS. 20, 21) and an engaged position (FIG. 24). The clip 120 is generally "U"-shaped when viewed from the front or rear (FIG. 18) and has a pair of biased arms 128 each having free ends 130 with "T"-bar formations 132. Associated hook lugs 134 on the port 126 receive and retain the "T"-bar formations 132 to prevent the clip 120 from being removed from the port 126 in an upward vertical movement. In addition, the clip 120 includes at least one depending guide formation 136 for engaging a corresponding slot 138 in the port 126 and an associated groove 140 in the nipple fitting 124 (FIG. 20). Preferably, there are a pair of depending guide formations 136, each associated with an associated groove 140 on each side of the nipple fitting 124. A tab 142 on an upper end 144 of the clip facilitates grasping by an operator for releasing the clip 120 when desired. If desired, the tab 142 is graspable using a pliers. The clips 120 are used to secure the vacuum breaker 108, the PRV 114, a drain line 146, and other connections as desired. In the case of the drain line 146, the clip 120 is used to permit easy access to a flow control disk (not shown). In other situations, the clip 120 is used to permit the valve body 14 to accommodate nipple fittings 124 having a variety of thread patterns.

Figure 22:
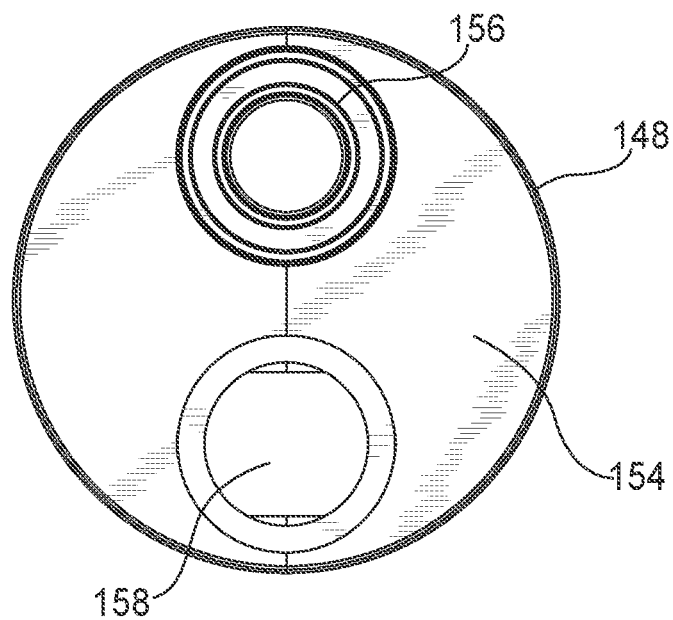
FIG. 22 is an overhead plan view of a brine redirect cap in the present control valve.
Figure 23:
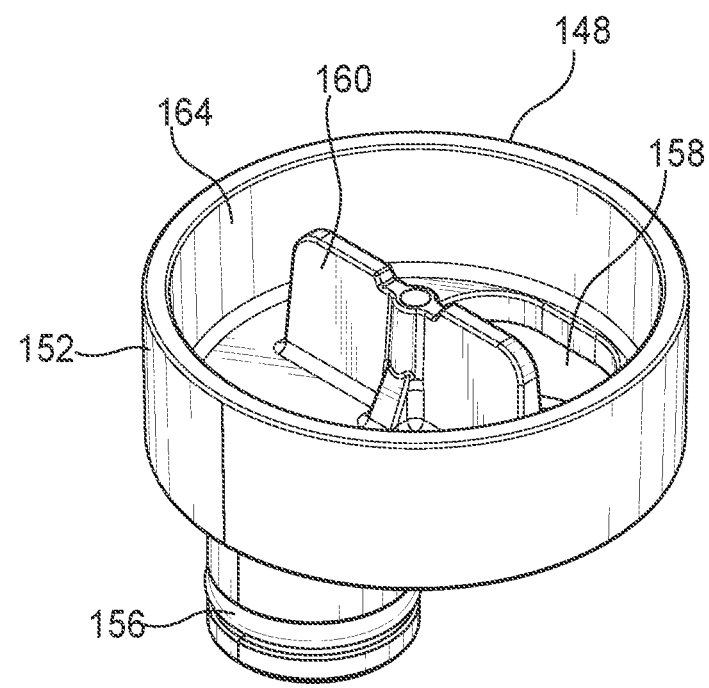
FIG. 23 is a top perspective view of the cap of FIG. 22.

Referring now to FIGS. 22-24, yet another feature of the present control valve 10 is a brine redirect cap or flow director 148 used to alter the flow direction of brine in the treatment tank 12 during regeneration, alternating between upflow and downflow, as is well known in the art. The cap 148 is dimensioned for being easily installed or removed from a designated recess 150 in the tank adapter 20. Included in the recess 150 is a pair of apertures (not shown), each connected to a respective end of the treatment tank 12.

Included on the cap 148 is a cup portion 152 defining an inner chamber 154. A nipple plug 156 depends from the cup portion 152 and is configured for engaging a selected one of the apertures in the recess 150. The cup portion 152 also has a flow aperture 158 dimensioned to be in registry with the other of the two apertures in the recess 150. At least one gripping tab 160 projects vertically in the chamber 154 for grasping by an operator. In use, the operator grasps the tabs and pulls up on the cap 148, and plugs the appropriate one of the two apertures in the recess 150, leaving the other aperture open for flow. In this manner, the flow direction is easily changed by pulling the cap 148 and axially rotating it to selectively plug one of the apertures in the recess 150, without requiring major changes in the valve 10 or rerouting of treatment water.

While a particular embodiment of the present control valve for a fluid treatment apparatus has been shown and described, it will be appreciated by those skilled in the art that changes and modifications may be made thereto without departing from the invention in its broader aspects and as set forth in the following claims.

What is claimed:

1. A control valve for a fluid treatment apparatus, comprising:
   a valve body having a control portion and a treatment portion, said portions being separated from each other so that fluid in said control portion is isolated from fluid in said treatment portion;
   said treatment portion including a plurality of piston valves reciprocating in corresponding cylinders for controlling water to be treated in said apparatus, ends of each said piston valves being disposed in said control portion;
   a tank adapter engageable on an end of said valve body opposite said control portion, said tank adapter having a depending tank fitting and defining a plurality of generally cylindrical seats open to an upper surface corresponding to and being in registry with said cylinders, each said seat dimensioned for receiving a corresponding one of said cylinders;
   a resilient annular seal being sealingly disposed in each said seat for preventing fluid passage between said cylinder and said tank adapter; and
   a clamp joining said tank adapter to said valve body.

2. The control valve of claim 1 wherein said clamp secures said tank adapter to said valve body by engaging corresponding annular flanges of said treatment portion and said tank adapter.

3. The control valve of claim 1 wherein said tank adapter is connected to said valve body solely by said clamp, said clamp disposed along a plane parallel to a plane defined by said resilient annular seals.

4. The control valve of claim 1 further including a vacuum breaker associated with said tank adapter, being integrally molded with said tank adapter and in fluid communication with a treatment tank.

5. The control valve of claim 1, further including a pressure relief valve mounted to said tank adapter.

6. The control valve of claim 5 wherein said pressure relief valve is mounted diametrically opposite a vacuum breaker.

7. A control valve for a fluid treatment device, comprising:
   a valve body having a control portion and a treatment portion, said portions being separated from each other so that fluid in said control portion is isolated from fluid in said treatment portion;
   said treatment portion including a plurality of piston valves reciprocating in corresponding cylinders for controlling water to be treated in said apparatus, ends of each said piston valves being disposed in said control portion;
   a tank adapter engageable on an end of said valve body opposite said control portion, said tank adapter defining a plurality of seats corresponding to said cylinders, each said seal dimensioned for receiving a corresponding one of said cylinders;
   least said valve body is connected to said tank adapter using resilient seals at connections of flow passageways for preventing leaks, providing a gasket-free connection of said body to said adapter; and
   at least one port, an associated nipple fitting, and a quick release clip connecting said nipple fitting to said associated port, said clip being generally "U"-shaped and having free ends with "T"-bar formations, said formations constructed and engaged for releasably lockingly engaging associated hook lugs on said valve body for preventing release of said clip from said body.

8. The control valve of claim 7, further including a valve body cap secured to said valve body on an end adjacent to said control portion; said cap provided with a spool controller configured for selectively directing control fluid to upper control cylinders in said control portion for controlling the flow of treatment fluid in said treatment portion said spool controller featuring a spool body with flow passageways sealed with resilient seals when corresponding enclosing bracket portions are assembled around said body in a gasket-free manner.

9. The control valve of claim 7 further including at least one flow director fitting constructed and arranged for being releasably engaged in said tank adaptor.

10. The control valve of claim 7, wherein said quick release clip includes at least one depending guide formation for engaging a corresponding slot in said port and an associated groove in said nipple.

11. The control valve of claim 10, wherein said at least one flow director fitting includes a cup portion defining an inner chamber and a nipple plug depending from said cup portion, said cup portion defining a flow aperture.

12. The control valve of claim 11, wherein said cup portion is further provided with at least gripping tab projecting from said cup portion so that an operator can grasp the flow director and rotate it for selectively plugging one of two apertures in a recess in said valve adapter.

13. A control valve for a fluid treatment device, comprising:
- a valve body having a control portion and a treatment portion, said portions being separated from each other so that fluid in said control portion is isolated from fluid in said treatment portion;
- said treatment portion including a plurality of piston valves reciprocating in corresponding cylinders for controlling water to be treated in said apparatus, ends of each said piston valves being disposed in said control portion;
- a tank adapter engageable on an end of said valve body opposite said control portion, said tank adapter defining a plurality of seats corresponding to said cylinders, each said seal dimensioned for receiving a corresponding one of said cylinders;
- at least said valve body is connected to said tank adapter using resilient seals at connections of flow passageways for preventing leaks, providing a gasket-free connection of said body to said adapter; and
- a valve body cap secured to said valve body on an end adjacent to said control portion; said cap provided with a spool controller configured for selectively directing control fluid to upper control cylinders in said control portion for controlling the flow of treatment fluid in said treatment portion said spool controller featuring a spool body with flow passageways sealed with resilient seals when corresponding enclosing bracket portions are assembled around said body in a gasket-free manner.

* * * * *